United States Patent
Moody et al.

(10) Patent No.: US 8,070,368 B1
(45) Date of Patent: Dec. 6, 2011

(54) HERMETICALLY PACKAGED LINBO3 OPTICAL CIRCUIT WITH OXIDIZING FILL GAS

(75) Inventors: John Moody, Red Bank, NJ (US); Robert Morris, Flanders, NJ (US)

(73) Assignee: L-3 Communications Corporation, Budd Lake, NJ (US)

(*) Notice: Subject to any disclaimer, the term of this patent is extended or adjusted under 35 U.S.C. 154(b) by 0 days.

(21) Appl. No.: 12/840,182

(22) Filed: Jul. 20, 2010

(51) Int. Cl.
*G02B 6/00* (2006.01)

(52) U.S. Cl. .................. 385/94; 385/3; 385/92

(58) Field of Classification Search .......... None
See application file for complete search history.

(56) References Cited

U.S. PATENT DOCUMENTS

| | | | | |
|---|---|---|---|---|
| 5,392,305 A | * | 2/1995 | Jakobson | 372/43.01 |
| 5,696,785 A | * | 12/1997 | Bartholomew et al. | 372/59 |
| 5,790,730 A | | 8/1998 | Kravitz et al. | |
| 6,085,005 A | * | 7/2000 | Gates et al. | 385/88 |
| 6,220,767 B1 | * | 4/2001 | Bookbinder | 385/94 |
| 6,744,519 B2 | | 6/2004 | Lange et al. | |
| 6,876,683 B2 | * | 4/2005 | Watanabe et al. | 372/36 |
| 7,186,912 B2 | | 3/2007 | Guan et al. | |
| 2004/0101016 A1 | | 5/2004 | McDonald et al. | |
| 2007/0116421 A1 | | 5/2007 | Hendry et al. | |
| 2008/0151952 A1 | * | 6/2008 | Takatani et al. | 372/36 |
| 2009/0086769 A1 | * | 4/2009 | Minamio et al. | 372/5 |
| 2010/0135610 A1 | | 6/2010 | Feth | |

FOREIGN PATENT DOCUMENTS

| | | | |
|---|---|---|---|
| JP | 2003-163407 A | * | 6/2003 |
| JP | 2003-298171 A | * | 10/2003 |

OTHER PUBLICATIONS

Moyer, R.S., et al., "Design and Qualification of Hermetically Packaged Lithium Niobate Optical Modulator," IEEE Transactions on Components, Packaging, and Manufacturing Technology—Part B, vol. 21, No. 2, May 1998, pp. 130-135.

* cited by examiner

*Primary Examiner* — Mike Stahl
(74) *Attorney, Agent, or Firm* — Proskauer Rose LLP

(57) ABSTRACT

A hermetically packaged integrated optical circuit includes an integrated optical circuit and a hermetically sealed container, which defines a volume. The integrated optical circuit is secured within the volume. The hermetically packaged integrated optical circuit further includes a fill gas comprising oxygen disposed within the volume of the hermetically sealed container.

17 Claims, 4 Drawing Sheets

HERMETICALLY PACKAGED LINBO3 OPTICAL CIRCUIT WITH OXIDIZING FILL GAS

FIELD OF THE INVENTION

The invention generally relates to hermetically packaged integrated optical circuits and more specifically, to hermetically packaged integrated optical circuits with an oxidizing fill gas.

BACKGROUND OF THE INVENTION

Integrated optical circuits ("IOCs") use optical waveguides on solid substrates to conduct and process optical signals. IOCs are used for a variety of applications, including in fiber optic gyroscopes ("FOGs"). A FOG uses light interference to detect the rotational motion of a body. FOGs are highly reliable and can provide precise rotational rate information. IOCs for use in FOGs consist primarily of an optical waveguide Y-junction and an electro-optical phase modulator, and are often constructed using lithium niobate single crystal substrates with Annealed Proton Exchange ("APE") waveguides. The APE waveguides are highly polarizing, which eliminates the need for a separate polarizer component in the FOG architecture.

FOGs are especially attractive for satellite pointing applications because of the low noise levels that can be achieved. However, performance degradation in orbit, which can be attributed to vacuum exposure of the APE lithium niobate integrated optical circuits, has been experienced in some early systems. Vacuum exposure can increase the electrical conductivity of the APE lithium niobate surface, which non-linearly decreases the electro-optic phase modulator efficiency and introduces noise into the FOG rate measurement.

Previous attempts to provide IOCs which are useful in a vacuum environment have not been successful. For example, U.S. Patent Application No. 2010/0135610 to Honeywell International Inc. addressed the issue of vacuum exposure of the APE by using a vacuum insensitive titanium in-diffused waveguide for the electro-optic phase modulator function, while retaining sufficient APE waveguide optical path length on a separate chip to provide the needed polarization extinction ratio. However, due to the number of fiber-to-chip pigtail connections used, the overall optical loss of this stitched system is increased, which decreases gyroscope performance. In addition, U.S. Patent Application No. 2007/0116421 to Honeywell International Inc. addressed the same problem by using a reactive gas protective coating on the vacuum sensitive surface of the IOC. However, this reactive gas coating loses effectiveness at the elevated temperatures needed for some important applications, including satellite applications.

SUMMARY OF THE INVENTION

There is an ongoing and growing need for high precision optical gyroscopes to replace less reliable mechanical gyroscopes in orbiting satellites. There is also a need to effectively package an IOC in a vacuum without introducing noise or compromising the integrity of the FOG measurement.

In one aspect, the invention features a hermetically packaged integrated optical circuit. The hermetic package includes an integrated optical circuit and a hermetically sealed container, which defines a volume. The integrated optical circuit is secured within the volume. The hermetically packaged integrated optical circuit further includes a fill gas comprising oxygen disposed within the volume of the hermetically sealed container.

In one embodiment, the integrated optical circuit is secured within the volume of the hermetically sealed container with an adhesive. The adhesive can be conductive. The adhesive can be selected from the group consisting of silicone, carbon-loaded silicone, indium, carbon-loaded epoxy, or indium solder. In some embodiments, the integrated optical circuit is secured within the volume of the hermetically sealed container with a mechanical securing feature, such as a spring clip or screw.

In some embodiments, the fill gas comprises about 5% to about 100% oxygen. In other embodiments, the fill gas can comprise about 5% to about 40% oxygen.

The integrated optical circuit can be a lithium niobate optical circuit. In some embodiments, the integrated optical circuit is a lithium tantalate optical circuit.

In some embodiments, the hermetically sealed container has a leak rate of less than about $10^{-8}$ standard cc/s air.

The integrated optical circuit can be configured to connect to a fiber coil. The integrated optical circuit can be a component of a fiber optic gyroscope. A FOG consists primarily of an integrated optical circuit, a fiber optic coil, a light source and a photodetector.

The invention, in another aspect, features a hermetically packaged integrated optical circuit. The hermetic package includes an integrated optical circuit and a hermetically sealed container defining a volume. The integrated optical circuit is secured within the volume. The hermetic package also includes a fill gas disposed within the volume of the hermetically sealed container. The fill gas consists essentially of oxygen and a tracer gas.

In some embodiments, the tracer gas is helium. The tracer gas can comprise about 2% to about 95% helium. In some embodiments, the fill gas comprises about 5% to about 100% oxygen. The fill gas can also include water vapor. In some embodiments, the fill gas can include about 500 ppm to about 5,000 ppm water vapor.

The invention, in another aspect, features a hermetically packaged integrated optical circuit. The hermetic package encloses an integrated optical circuit. The hermetic package also includes a means for securing the integrated optical circuit within a hermetically sealed container with a carbon-loaded silicone adhesive. In one embodiment, the means for securing the integrated optical circuit comprises an adhesive. In other embodiments, the means for securing the integrated optical circuit comprises a mechanical securing feature, for example, a spring clip or a screw. The hermetically sealed container is configured to enclose the integrated optical circuit. The hermetic package also includes a means for inputting a fill gas to surround the integrated optical circuit. In one embodiment, the input means comprises a small hole, or inlet port, in the lid of the hermetic package that is configured to be soldered shut after the hermetic package is filled with the fill gas. The fill gas consists essentially of oxygen, and a tracer gas.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
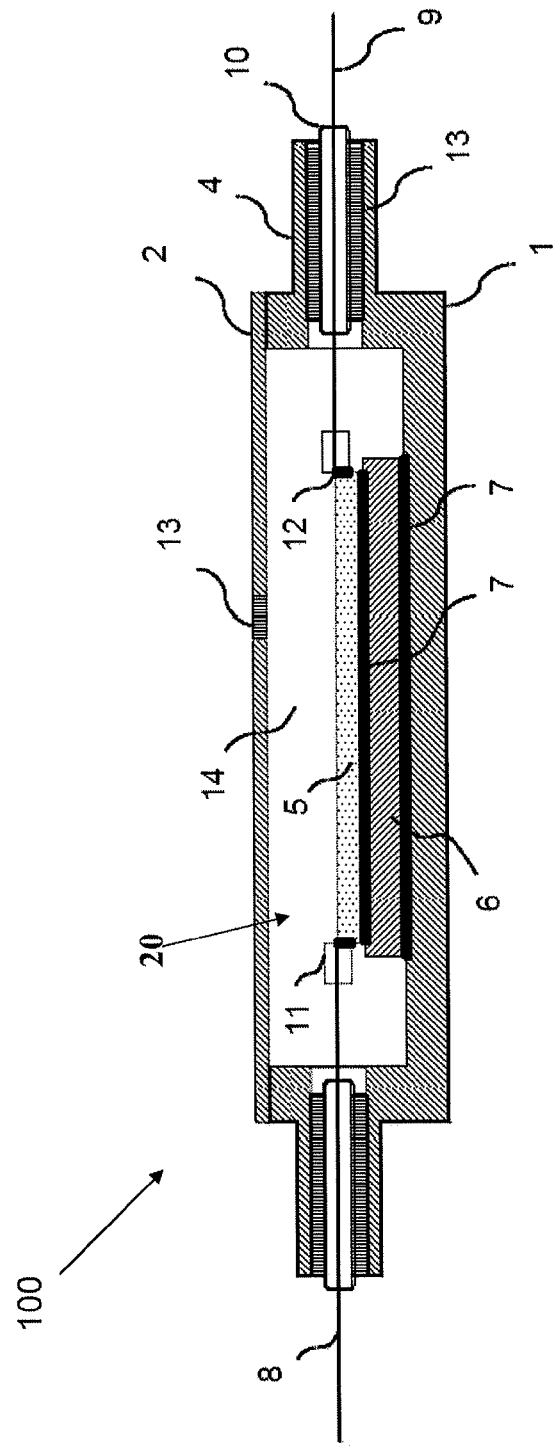
FIG. 1 is a side view of a hermetically sealed integrated optical circuit, according to an illustrative embodiment of the invention.

The prior art hermetically packaged IOCs, created for telecommunications applications in harsh terrestrial environments, typically use nitrogen as a fill gas and a silver-epoxy adhesive to secure the IOC to a wall of the hermetic package. They also typically employ lithium niobate substrates with titanium-in-diffused waveguides, which are not sensitive to vacuum or low oxygen partial pressure environments. Like most other hermetically packaged electronic and optical components, these prior art hermetically packaged IOCs are processed to minimize oxygen and water vapor in the fill gas. Oxygen is typically minimized because of its ability to react chemically with the internal components of the packaged IOCs. Instead, an inert gas, for example, nitrogen, has been used in the prior art. Water vapor is typically minimized due to specific military specification ("MIL SPEC") requirements to prevent condensation of liquid water at low temperatures, which can lead to corrosion of the IOC components. The MIL SPEC guidelines require that the water vapor within the hermetic package not exceed 5,000 ppm.

In addition, the prior art typically secures the IOC within the hermetic package using a silver epoxy adhesive. Silver epoxy adhesives have been used due to their strong adhesive qualities. In addition, commercially available silver epoxy adhesives are considered thermally stable in a variety of environments. Silver epoxy adhesives are also conductive, which is beneficial to bleed off pyroelectric charge produced on the ferroelectric lithium niobate chip surfaces by temperature changes the IOC can be exposed to during use.

Through testing it was found that the non-hermetically packaged FOG IOCs of the prior art were not stable in the vacuum environment required for space applications. The prior art hermetically packaged IOCs, created for telecommunications applications, are not easily adaptable for FOG applications because of the lack of polarizing waveguides. However, the non-hermetically packaged APE lithium niobate FOG IOCs of the prior art are known to be stable in an atmosphere that resembles room air. Unfortunately, room air contains substantially more water vapor than the 5000 ppm allowed by the MIL SPEC requirements. In accordance with one aspect of the invention, it was determined that oxygen and, to a much lesser extent, water vapor are responsible for the stable low-noise operation of the lithium niobate IOCs tested in room air. Therefore, to effectively package an IOC in a vacuum without introducing noise or compromising the integrity of the FOG measurement, it was determined that oxygen, containing less than 5000 ppmv moisture, can be used as a fill gas in a hermetically packaged IOC to provide a performance-stabilizing atmosphere.

However, when the nitrogen fill gas of the prior art hermetically packaged IOCs was substituted with oxygen in accordance with the present invention, extremely high water levels were observed in industry-standard Residual Gas Analysis ("RGA") testing. Through additional testing, it was determined that the prior art silver epoxy adhesive and the oxygen fill gas of the present invention reacted to form water and $CO_2$ (see Example 1). This was surprising because it is generally thought that commercially available epoxy resins are thermally stable and do not break down even in an oxygen environment.

Therefore, in accordance with one aspect of the invention, different adhesives were tested to determine if they could be applied in the present invention. It was discovered that a carbon-loaded silicone adhesive does not react with oxygen and provides sufficient shear strength and electrical conductivity for the intended application of the present invention. It was surprising to learn that carbon-loaded silicone adhesives could be used because silicone adhesives do not have as strong adhesive properties as silver epoxy adhesives. Other adhesives can also be used, such as silicone, indium, carbon-loaded epoxy, or indium solder.

Figure 2:
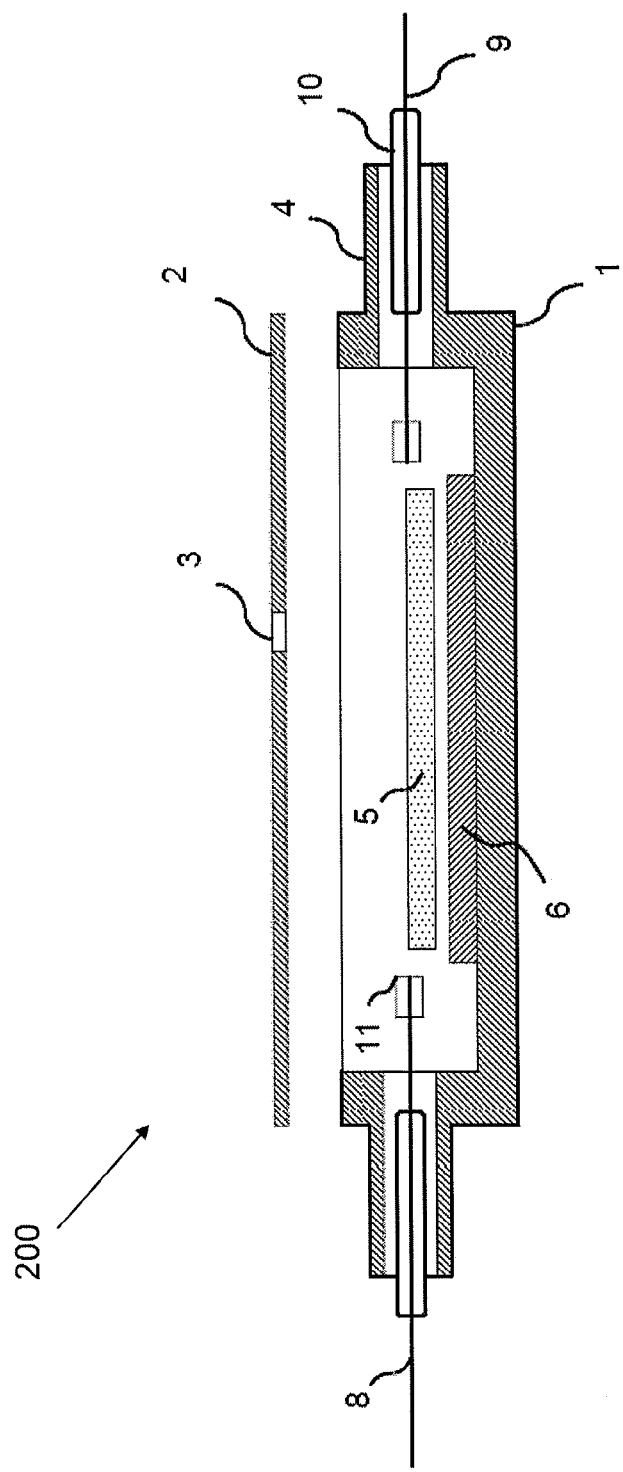
FIG. 2 is a side view of the components of the integrated optical circuit hermetic package prior to adhesive bonding and hermetic sealing.

FIG. 1 is a side view of a hermetically sealed integrated optical circuit 100, according to an illustrative embodiment of the invention. FIG. 2 is a side view of the components of the integrated optical circuit hermetic package 200 prior to adhesive bonding and hermetic sealing.

Referring to FIGS. 1 and 2, the invention features a hermetically packaged IOC 100, 200. The IOC 5 can be a lithium niobate IOC or a lithium tantalate IOC. The IOC 5 comprises waveguides, for example annealed proton exchange waveguides (not shown).

The hermetically sealed container 1 defines a volume 20. The IOC 5 is secured within the volume 20. For example, IOC 5 can be secured to the bottom wall of the hermetically sealed container 1. In some embodiments, the IOC 5 is secured to any other wall of the hermetically sealed container 1. A sub-mount 6 can be secured to the floor of the hermetically sealed container 1 and to the downward facing surface of the IOC 5.

The sub-mount 6 can be made from stainless steel. Other sub-mount materials, including lithium niobate crystal slabs and various ceramic, glass, and metal alloys, can be used provided the thermal expansion mismatch between the IOC and the mounting means is less than about 5 ppm/° C.

In some embodiments, a sub-mount is not used to secure the IOC within the volume of the hermetically sealed container. Other IOC support designs may be used provided that the IOC is isolated from thermal expansion strains by design. A controlled thickness of compliant adhesive may be used as an IOC support.

The IOC 5 and sub-mount 6 can be secured within the volume 20 of the hermetically sealed container 1 using an adhesive 7. In some embodiments, the adhesive 7 is conductive. A conductive die attach adhesive can be used to bleed off pyroelectric charge produced on the ferroelectric lithium niobate chip surfaces by temperature changes that can occur during use of the IOC (e.g., during operation in a satellite).

The adhesive 7 can be silicone, carbon-loaded silicone, indium, carbon-loaded epoxy, or indium solder. The adhesive 7 can be electrically conductive NuSil™ CV1-2640 adhesive. Other oxygen-stable and electrically dissipative polymeric adhesives can also be used to secure the IOC and/or sub-mount.

In some embodiments, the adhesive 7 used to secure the IOC 5 to the sub-mount 6 and the adhesive used to secure the sub-mount 6 to the hermetically sealed container 1 are different adhesives. In other embodiments, the adhesive 7 used to secure the IOC 5 to the sub-mount 6 and the adhesive 7 used to secure the sub-mount 6 to the hermetically sealed container are the same adhesive.

In some embodiments, the IOC 5 is mechanically secured to the sub-mount 6 or hermetically sealed container 1 using a mechanical securing feature. For example, the IOC 5 and/or the sub-mount 6 can be secured using a spring clip or screw.

The IOC can be packaged within a container 1 (e.g., a machined Invar™ alloy enclosure) with a welded-on lid 2 and three solder-sealed optical fiber feed-through snouts 4. The container 1 can also be made from a glass, metal, metal alloy, or composite material. Optical fiber pigtail assemblies, which can include lengths of single-mode, polarization-maintaining optical fiber 8 and 9, optically polished glass capillary ends 11, and hermetically attached ferrules 10 can be bonded to the end faces of the IOC 5 using an optical adhesive 12 (e.g., Norland™ optical adhesive). The optical fiber pigtail assemblies can be sealed into the optical fiber feed-through snouts 4 using a solder 13, for example, a lead-tin solder. Lead-tin solder can also be used to seal a small hole 3 in the lid 2 after evacuating the enclosure and purging the enclosed space and contents of moisture and other volatile contaminants and then backfilling with the fill gas.

Other optical fiber interfaces and hermetic feed through designs can also be used as long as the resulting leak rate is about $10^{-8}$ standard cc/second or lower and the RGA moisture level is less than about 5000 ppmv. Other optical fiber interfaces include incorporation of hermetic ferrule design elements into the container.

A fill gas 14, comprising oxygen, is disposed within the volume 20 of the hermetically sealed container 1 after the container 1 has been evacuated and purged. For example, the hermetically sealed container 1 can be backfilled with a gas containing at least 0.05 atmosphere partial pressure of oxygen. In some embodiments, the gas contains about 5% to about 100% oxygen, and more preferably about 5% to about 40% oxygen.

The gas can also contain a tracer gas, for example, helium, to allow sensitive leak measurement so the life of the packages can be verified. The quantity of the tracer gas should be sufficient to allow hermeticity testing to a leak rate of about $10^{-8}$ cc/second or lower and more preferably about $10^{-9}$ cc/second or lower. For example, the tracer gas can comprise about 2% to about 95% helium.

When a tracer gas is not used as part of the fill gas, the leak rate of the hermetically sealed container can still be tested. In some embodiments, the leak rate can be tested by a pressure bomb method. After the container 1 is hermetically sealed and pressure tested, a gas comprising a radioactive isotope (e.g., $^{85}$Kr) is forced into the hermetically sealed container 1 using pressure. If there are no leaks within the hermetically sealed container 1, then no radioactive isotope atoms can enter the container. However, if there are leaks within the hermetically sealed container 1, then the radioactive isotope can enter the container 1. The amount of the radioactive isotope that enters the hermetically sealed container 1 can be determined with a counter. Based on the results of the counter, the leak rate of the hermetically sealed container 1 can be calculated.

The fill gas can also comprise water vapor. In some embodiments, a nominal amount of water vapor enters the hermetically sealed container 1 during backfilling of the fill gas. The water vapor can also be formed within the hermetically sealed container 1 due to the oxygen in the fill gas reacting with the hydrogen from the hydrocarbons within the package or the metal alloy that can form the walls of the hermetically sealed container 1. For example, after equilibration for several hours at about 100° C., the atmosphere 14 within the volume 20 of the hermetically sealed container 1 can contain between about 100 to about 5000 parts per million by volume (ppmv) moisture and more preferably between about 500 and about 1500 ppmv.

If the amount of water vapor within the hermetically sealed container 1 is too high (e.g., above about 5,000 ppm), the water vapor can corrode the components of the IOC 5. If the amount of water vapor within the hermetically sealed container 1 is too low (e.g., below about 100 ppm), then the crystal surface of the IOC 5 can be damaged due to electron build-up on the surface of the crystal.

The hermetically sealed IOC 100, 200 can be made in a variety of ways. For example, the container sub-assembly 1, optical fiber sub-assembly and the IOC 5 sub-assembly can be fabricated separately. This allows different configurations of the final hermetically packaged IOC to be made. Once the sub-assemblies are either fabricated or received from a vendor, the IOC 5 can be secured to the container 1 sub-assembly. In some embodiments, the IOC 5 can be first secured to a sub-mount 6, which is secured to the container 1 sub-assembly. The electrical interconnections between the IOC 5 and the container 1 electrical feedthroughs (not shown) can be made using standard wirebonding techniques.

The optical fiber sub-assemblies, including the input and output optical fibers 8, 9 can then be placed in contact with the IOC 5 and container 1 and aligned with the waveguides on the IOC (not shown). The optical fiber sub-assemblies can then be secured with an adhesive 12, for example, a UV curable adhesive.

The container 1 can be sealed, for example, with a solder seals 13. The hermeticity of the container 1 can be checked by evacuating the container 1 and using a tracer gas to detect any leaks. The lid 2, which includes a small hole 3, can then be sealed to the container 1, for example, with a standard seam sealer. The container 1 with lid 2 attached can again be leaked checked by using the small hole 3 on the lid 2.

The container 1 can then be vacuum baked and backfilled through the small hole 3 in the lid 2 with a fill gas comprising oxygen. The small hole 3 in the lid 2 is then closed, for example, with a solder seal 13.

Figure 3:
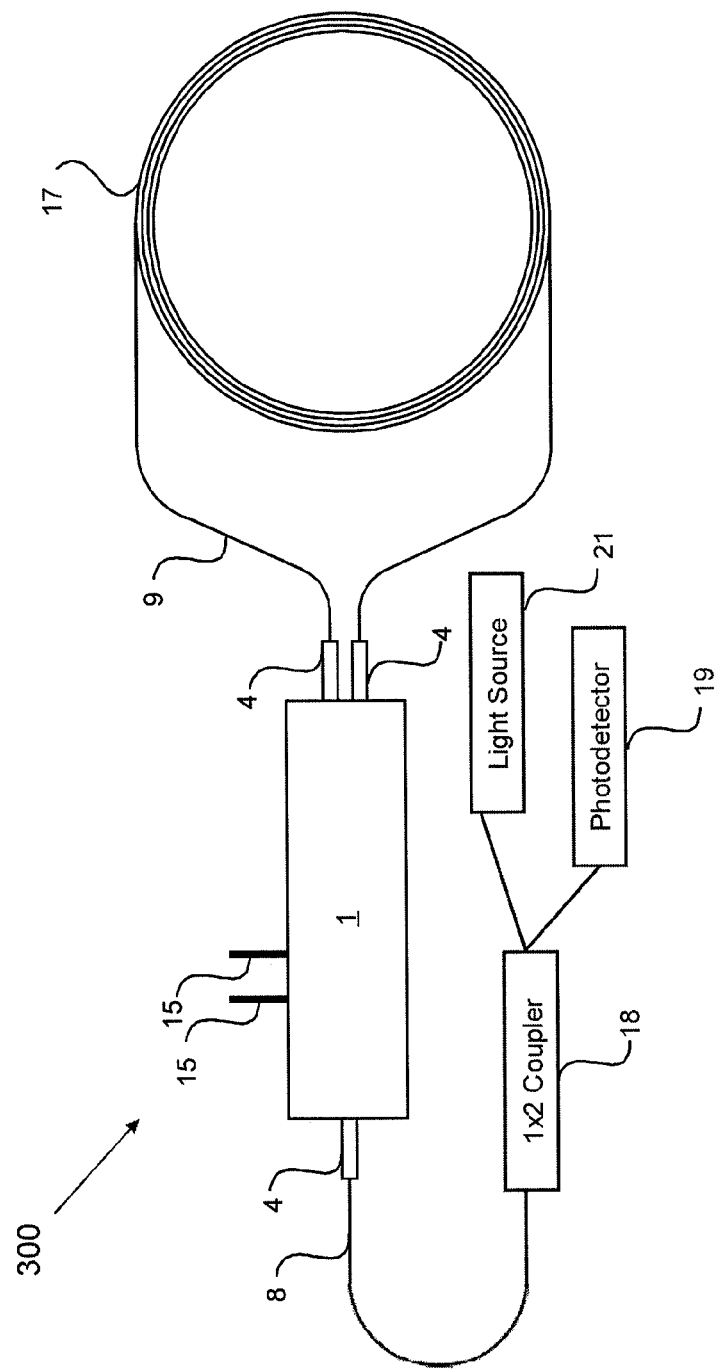
FIG. 3 is a schematic illustration of a fiber optic gyroscope, according to an illustrative embodiment of the invention.

FIG. 3 is a schematic illustration of a fiber optic gyroscope 300, according to an illustrative embodiment of the invention. The hermetically sealed integrated optical circuit 1 can be configured to connect to a fiber optic coil 17, for example, when the integrated optical circuit (e.g., the IOC 5 of FIGS. 1 and 2) is a component of a FOG 300. The fiber optic coil 17 is used to detect the rotation of the FOG 300.

The hermetically sealed container 1 includes one optical fiber feed-through snout 4 at the left end of the container 1 and two optical fiber feed-through snouts 4 at the right end of the container 1. Lengths of single-mode, polarization-maintaining optical fiber 8 and 9 can be bonded to the end faces of the IOC (e.g., the IOC 5 of FIGS. 1 and 2). Two electrical connections 15 can be used to apply voltage to the IOC. In some embodiments, additional electrical connections 15 can be used.

The IOC (e.g., the IOC 5 of FIGS. 1 and 2), which is secured within the hermetically sealed container 1, can comprise an electro-optic phase modulator that contains a plurality of electrodes (not shown). The IOC can modulate light that is received from a light source 21. The light source 21 can be any light source that can be used for FOG applications. The specific light source that is used can depend on the specific application and the required precision of the FOG rotational measurements.

The 1×2 coupler 18 transmits the light emitted from the light source 21 through optical fiber 8 to the IOC, which also comprises a Y-splitter. The Y-splitter in the IOC can be used to split the signal carried by input optical fiber 8 into two signals carried by output optical fibers 9. Optical fibers 9 can be connected to a fiber optic coil 17. When the light signal is split, one signal can travel clockwise through the fiber optic coil 17 and one signal can travel counter-clockwise through the fiber optic coil 17. The two signals can be recombined and the difference between the phases of the signals and time it takes for the signals to pass through the fiber optic coil 17, can be used to calculate the rotational motion of a body, for example, a satellite.

In addition to transmitting the light emitted from the light source 21 to the IOC, the 1×2 coupler 18 also transmits the light that is returned from the fiber coil 17 and IOC to the photodetector 19. The photodetector 19 detects the light signal that is returned from the fiber coil 17 and the IOC. The information detected by the photodetector 19 can be used to calculate the rotational motion of the FOG 300.

Figure 4:
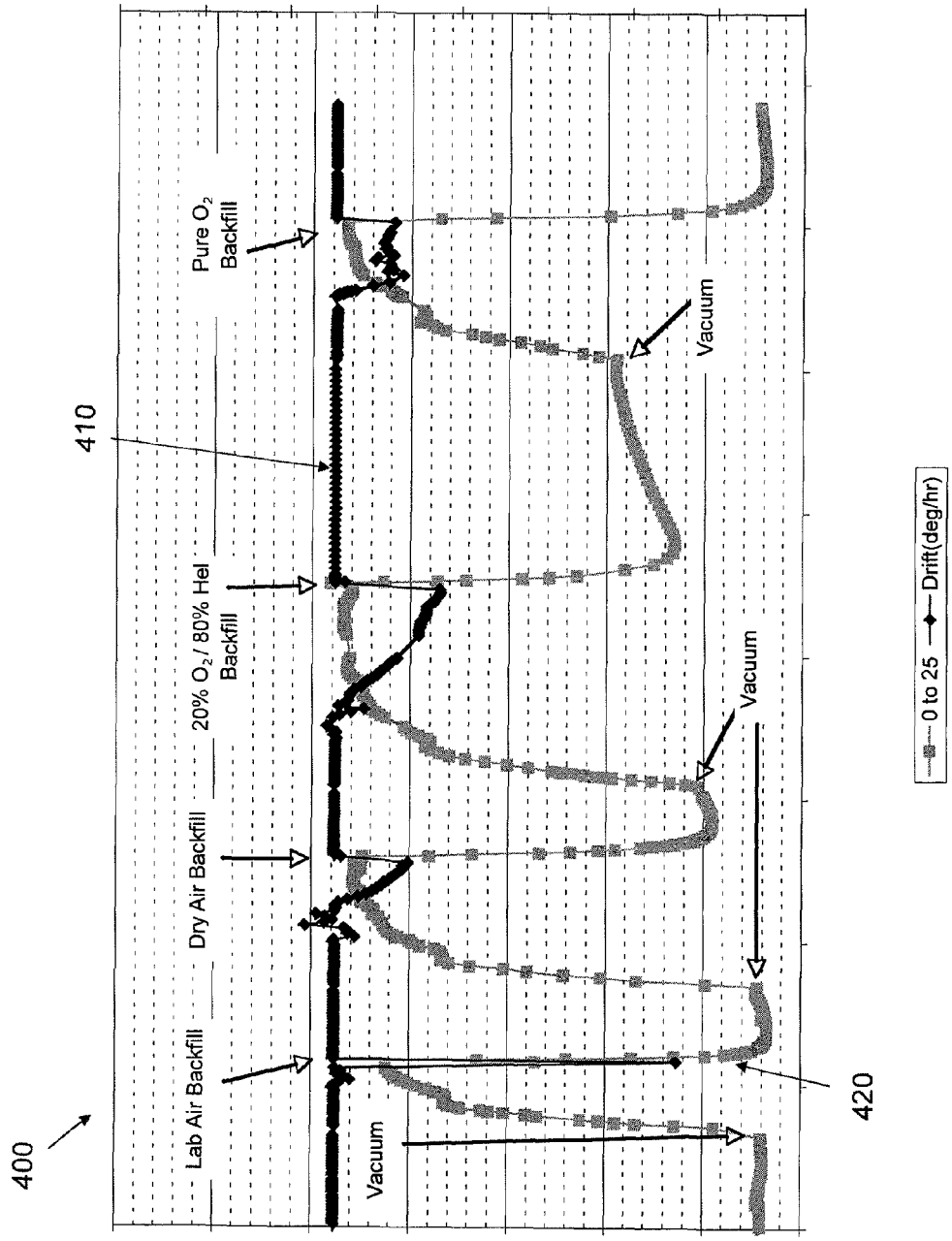
FIG. 4 is a graph of PSD noise and gyroscope drift of a fiber optic gyroscope with a non-hermetically packaged IOC in various environments including vacuum and several oxygen-containing gases.

FIG. 4 is a graph 400 of PSD noise and gyroscope drift versus time of a fiber optic gyroscope operating in a vacuum chamber with a non-hermetically-packaged IOC, such that the IOC surface is exposed to the environment within the chamber. This graph illustrates the de-stabilizing effect of vacuum environment and the stabilizing effect of oxygen. The drift of about 9.6 degrees/hour 410 represents the FOG measurement of the vertical component of the earth's rotation rate at the location of the test. When vacuum is applied at the times indicated on the graph, the 0-25 Hz PSD noise begins to increase. It can be seen that the drift measurement is disrupted when the 0-25 Hz PSD noise 420 exceeds about 8 deg/hr. The graph also shows that the PSD noise decreases to low levels when the chamber containing the fiber optic gyroscope is backfilled with gases containing oxygen, including lab air (containing about 20,000 ppmv moisture), dry air (less than 10 ppmv moisture), 20% oxygen 80% helium, and 100% oxygen. In principle, stable operation of a fiber optic gyroscope in vacuum could be obtained, by enclosing the entire device in a sealed chamber containing an oxidizing gas. However, due to the number and diversity of materials used in the FOG it can be very difficult to maintain moisture levels below 5000 ppmv. The present invention simplifies the problem by hermetically packaging only the IOC.

Example 1

This example illustrates the problems encountered using state-of-the-art opto-electronic packaging technologies to hermetically seal APE IOCs in an oxidizing environment. Two hermetically packaged IOC assemblies ("IOCAs") were prepared following the general procedure described above and illustrated in FIGS. 1, 2 and 3. Two Kovar™ enclosures were machined to include three optical fiber feed-through snouts, one on the input end for the input fiber and two on the opposing end for the two output fibers. The optical fiber input and output pigtails, each comprising a several-meter-long length of optical fiber bonded to an end-polished glass capillary and a hermetically sealed ferrule, were obtained from an outside vendor in a pre-assembled state, as illustrated in FIG. 2. The lithium niobate IOCs were obtained as bare die with optically polished end faces intersecting the input and output waveguides at a small angle optimized to reduce reflections.

For each package, the first step was to secure the stainless steel sub-mount onto the floor of the Kovar™ enclosure using a commercially available conductive die-mount adhesive with composition and properties closely resembling those of Epotek® H20E, which is a silver-filled epoxy resin. After curing the die-mount adhesive for 4 hours at 65° C., the lithium niobate IOC was affixed to the top of the sub-mount using the same adhesive and cure cycle. The optical fiber pigtail assembly capillary polished ends were positioned against the polished ends of the IOC and a small drop of ultraviolet curable optical adhesive, with composition and properties similar to those of Norland™ 61, was placed in the interfaces between the IOC and the capillary ends. The optical fiber waveguides were then simultaneously aligned with the input and output waveguides of the IOC to optimize the throughput of polarized light using a special purpose 6-axis alignment station. After the alignment was complete, the fiber pigtail interface junctions were first exposed to ultraviolet light to fix their positions and the unit was then baked for 12 hours at 50° C. to complete the cure. Next, the ferrules were positioned in the snouts in such a way as to create a gentle s-bend in the section of optical fiber contained within the package enclosure. This bend eliminates tensile stress in the pigtail interface and allows a small range of motion to accommodate the slight difference in thermal expansion between the lithium niobate IOC and the Kovar™ enclosure. The last step before sealing the package was to wire-bond electrical connections between the bonding pads on the lithium niobate IOC and the conventional glass-metal seal electrical feedthroughs in the sidewall of the Kovar™ enclosure.

The Kovar™ lid was welded onto the top of the enclosure using a standard seam sealer and the nearly completed package was tested for hermeticity using standard helium leak detection methods and equipment. The measured He leak rate was less than $10^{-8}$ standard cc helium/second. The package was then placed in a fill chamber and vacuum baked for 12 hours at 100° C. to remove residual adsorbed water and other volatile contaminants. Finally, the chamber was backfilled with a gas consisting of 40 vol. % oxygen 60 vol. % helium and the fill hole was closed with a small bead of solder. Analysis of gas samples from the fill chamber confirmed that the fill gas used in this process contained less than 20 parts per million by volume ppmv moisture.

The two IOCAs were subjected to the MIL-STD-883 Residual Gas Analysis ("RGA") test in which the parts were placed in a vacuum chamber and baked at 100° C. overnight, after which their lids were pierced, allowing the fill gas to be analyzed by mass spectrometry. The two packages were found to contain 49,990 and 66,200 ppmv moisture and also unexpectedly high $CO_2$ levels of 4,070 and 4,190 ppmv, respectively. The RGA determined moisture level was much higher than the MILSPEC limit of 5,000 ppmv. These results indicated that the silver epoxy adhesive was reacting with the oxygen fill gas to form water vapor.

Example 2

This example illustrates the dramatic improvement in the RGA determined moisture level that resulted from replacement of the standard silver-epoxy die bond adhesive with Nusil™ CV 1-2640 adhesive. Nusil™ CV 1-2640 is a silicone-carbon composition with sufficient electrical conductivity to dissipate pyroelectric surface charges on the lithium niobate IOC. A hermetically sealed IOC was processed using the procedure described in Example 1, except that Nusil™ CV 1-2640 adhesive was used to attach the stainless steel sub-mount to the floor of the Kovar™ enclosure and to attach the lithium niobate chip to the stainless steel sub-mount.

After processing, the RGA test revealed 1,199 ppmv moisture and 259 ppmv $CO_2$. This moisture level is well within the 5,000 ppmv MIL SPEC requirement. This result confirmed that the oxygen in the fill gas was reacting with the silver epoxy to form water vapor. In contrast, the when the silicone carbon adhesive composition was used, the moisture level remained within the MIL SPEC requirement.

The bond strength of Nusil™ CV1-2640 to metal and ceramic surfaces is significantly lower than that of the conventional epoxy-based die attach adhesives. However, die shear tests showed that the bond strength was more than adequate. This indicated that, even though the bond strength of the silicone-carbon adhesive composition is less than that of the conventional epoxy-based die attach adhesives, the silicone-carbon adhesive can be used for the intended applications of the present invention.

Example 3

Hermetically-sealed IOCs of the present invention, similar to that described in Example 2, have also been subjected to industry standard component qualification testing, including mechanical shock and vibration, thermal shock, temperature cycling, fiber pull, and accelerated aging, and have exhibited no measurable degradation in performance.

Example 3 demonstrates the mechanical robustness and stability of hermetically packaged IOCs of the present invention. Thirty-nine IOCs, similar to the one described in Example 2, were prepared for qualification testing based on the Telcordia 468 protocol. The fill gas in each unit was 40% by volume $O_2$ 60% by volume He.

Fifteen of these were subjected to vibration testing per MIL-STD-883 Method 2026 Condition I, Letter F vibration for 3 minutes per axis. The same fifteen units were then subjected to mechanical shock per MIL-STD-883 Method 2002, including five 500 G 1.0 millisecond shocks per axis. After the vibration and shock exposures, the optical and electro-optical functional performance of each unit was tested and no significant degradation in functional performance was observed.

The other twenty-four units were subjected to 10 air-to-air thermal shock cycles between −25° C. and +90° C., followed by Thermal Cycling per MIL-STD-883 Method 1010, including 100 cycles between −10° C. and +90° C. Then the same twenty-four units were subjected to moisture resistance exposure per MIL-STD-883 Method 1004 including 10 cycles of exposure to +65° C. 90% relative humidity. After the thermal cycling, thermal shock and moisture resistance exposures, the optical and electro-optical performance of each unit was tested and no significant degradation in performance was observed.

After the mechanical and thermal exposures and functional testing were complete, three devices from the mechanical exposure group and three from the thermal exposure group were subjected to RGA testing per MIL-STD-883 Method 1018. In each unit tested, the measured oxygen level was slightly higher than the nominal 40% by volume value and the measured moisture levels ranged between 1700 and 2500 ppmv.

Although various aspects of the disclosed invention have been shown and described, modifications may occur to those skilled in the art upon reading the specification. The present application includes such modifications and is limited only by the scope of the claims

What is claimed is:

1. A hermetically packaged integrated optical circuit comprising:
   an integrated optical circuit comprising a phase modulator;
   a hermetically sealed container defining a volume, the integrated optical circuit secured within the volume; and
   a fill gas comprising oxygen disposed within the volume of the hermetically sealed container.

2. The hermetically packaged integrated optical circuit of claim 1 wherein the integrated optical circuit is secured within the volume of the hermetically sealed container with an adhesive.

3. The hermetically packaged integrated optical circuit of claim 2 wherein the adhesive is conductive.

4. The hermetically packaged integrated optical circuit of claim 2 wherein the adhesive is selected from the group consisting of silicone, carbon-loaded silicone, indium, carbon-loaded epoxy, and indium solder.

5. The hermetically packaged integrated optical circuit of claim 1 wherein the integrated optical circuit is secured within the volume of the hermetically sealed container with a mechanical securing feature.

6. The hermetically packaged integrated optical circuit of claim 1 wherein the fill gas comprises about 5% to 100% oxygen.

7. The hermetically packaged integrated optical circuit of claim 1 wherein the integrated optical circuit is a lithium niobate optical circuit.

8. The hermetically packaged integrated optical circuit of claim 1 wherein the integrated optical circuit is a lithium tantalate optical circuit.

9. The hermetically packaged integrated optical circuit of claim 1 wherein the hermetically sealed container has a leak rate of less than about $10^{-8}$ standard cc/second air.

10. The hermetically packaged integrated optical circuit of claim 1 wherein the integrated optical circuit is configured to connect to a fiber coil.

11. The hermetically packaged integrated optical circuit of claim 1 wherein the integrated optical circuit is a component of a fiber optic gyroscope.

12. A hermetically packaged integrated optical circuit comprising:
    an integrated optical circuit comprising a phase modulator;
    a hermetically sealed container defining a volume, the integrated optical circuit secured within the volume; and
    a fill gas disposed within the volume of the hermetically sealed container, wherein the fill gas consists essentially of oxygen and a tracer gas.

13. The hermetically packaged integrated optical circuit of claim 12 wherein the tracer gas comprises helium.

14. The hermetically packaged integrated optical circuit of claim 13 wherein the tracer gas comprises about 2% to about 95% helium.

15. The hermetically packaged integrated optical circuit of claim 12 wherein the fill gas comprises about 5% to about 100% oxygen.

16. The hermetically packaged integrated optical circuit of claim 12 wherein the fill gas further comprises about 500 ppm to about 5,000 ppm water vapor.

17. A hermetically packaged integrated optical circuit comprising:
    a phase modulator;
    a means for securing the phase modulator within a hermetically sealed container with a carbon-loaded silicone adhesive, wherein the hermetically sealed container is configured to enclose the phase modulator; and
    a means for inputting a fill gas to surround the phase modulator, wherein the fill gas consists essentially of oxygen and a tracer gas.

* * * * *